United States Patent
Hashimoto (10) Patent No.: US 7,251,819 B2
(45) Date of Patent: Jul. 31, 2007

(54) OPTICAL PICKUP DEVICE EMPLOYING MAGNET AND TRACKING COIL TO DRIVE OBJECTIVE LENS IN TRACKING DIRECTION

(75) Inventor: Chiaki Hashimoto, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 413 days.

(21) Appl. No.: 10/911,053

(22) Filed: Aug. 4, 2004

(65) Prior Publication Data
US 2005/0034143 A1    Feb. 10, 2005

(30) Foreign Application Priority Data
Aug. 7, 2003    (JP)    ............... 2003-289057

(51) Int. Cl.
*G11B 7/09* (2006.01)
(52) U.S. Cl. ..................................... 720/683
(58) Field of Classification Search .............. 720/683, 720/681
See application file for complete search history.

(56) References Cited
U.S. PATENT DOCUMENTS

| 6,452,895 | B1 * | 9/2002 | Kawano ................. 720/681 |
| 6,825,999 | B2 * | 11/2004 | Suzuki et al. .......... 359/824 |
| 6,839,899 | B2 * | 1/2005 | Takeshita et al. ........ 720/681 |
| 6,996,037 | B2 * | 2/2006 | Huang et al. ........... 369/44.22 |

FOREIGN PATENT DOCUMENTS

| JP | 03-222122 | 10/1991 |
| JP | 07-098879 | 4/1995 |
| JP | 8-180441 | 7/1996 |
| JP | 9-198684 | 7/1997 |
| JP | 10-312556 | 11/1998 |
| JP | 2000-353329 | 12/2000 |
| JP | 2001-101684 | 4/2001 |
| JP | 2002-50060 | 2/2002 |
| JP | 2002-050061 | 2/2002 |
| JP | 2003-30870 | 1/2003 |
| JP | 3093724 | 2/2003 |

OTHER PUBLICATIONS machine translation of JP 2001-101684 A.*
Patent Abstracts of Japan, Publication No. 2002-050060 dated Feb. 15, 2002, 1 pg.
Patent Abstracts of Japan, Publication No. 08-180441 dated Jul. 12, 1996, 1 pg.

(Continued)

Primary Examiner—Julie Anne Watko
(74) Attorney, Agent, or Firm—Osha Liang LLP (57) ABSTRACT

An optical pickup device includes an objective lens holder having a pair of tracking coils and an objective lens fixed thereto, and a pair of magnets. The pair of tracking coils are rectangular or square in geometry. When the objective lens is not displaced in a tracking direction, one tracking coil has a vertical portion closer to a centerline, which passes through the pair of magnets at their respective centers, at a position distant from the centerline in a positive direction of rotation by a prescribed angle θ and the other tracking coil has a vertical portion closer to the centerline at a position distant from the centerline in a negative direction of rotation by the prescribed angle θ.

20 Claims, 9 Drawing Sheets

OTHER PUBLICATIONS

Patent Abstracts of Japan, Publication No. 2003-030870 dated Jan. 31, 2003, 1 pg.
Patent Abstracts of Japan, Publication No. 09-198684 dated Jul. 31, 1997, 1 pg.
Patent Abstracts of Japan, Publication No. 10-312556 dated Nov. 24, 1998, 1 pg.
Patent Abstracts of Japan, Publication No. 2000-353329 dated Dec. 19, 2000, 1 pg.
Notice of Ground of Rejection, mailed Nov. 22, 2005, regarding Patent Application No. 2003-289057, dated Aug. 7, 2003, with English Translation (6 pages).
Patent Abstracts of Japan, Application No. 07-098879, dated Apr. 11, 1995 (1 page).
Patent Abstracts of Japan, Application No. 2001-101684, dated Apr. 13, 2001 (1 page).
Japan Patent Office, Application No. 3093724, dated Feb. 19, 2003, with Partial English Translation of JP-3093724, dated Feb 19, 2003 (3 pages).
Patent Abstracts of Japan, Application No. 03-222122, dated Oct. 1, 1991 (1 page).
Patent Abstracts of Japan, Application No. 2002-050061, dated Feb. 15, 2002 (1 page).

* cited by examiner

OPTICAL PICKUP DEVICE EMPLOYING MAGNET AND TRACKING COIL TO DRIVE OBJECTIVE LENS IN TRACKING DIRECTION

BACKGROUND OF THE INVENTION

1. Field of the Invention

The present invention relates generally to optical pickup devices and particularly to optical pickup devices having an objective lens holder with a pair of tracking coils and an objective lens fixed thereto, and a pair of magnets each generating a magnetic field, and the tracking coil is exposed to the magnetic field, while the coil has an electric current passed therethrough to drive the objective lens in a tracking direction.

2. Description of the Background Art

An optical pickup device drives an objective lens holder having an objective lens fixed thereto, in tracking and focusing directions to positionally control the objective lens. The objective lens holder has tracking and focusing coils fixed thereto and is penetrated by a single axis of rotation. Furthermore, around the objective lens holder, a pair of magnets is arranged.

The magnets generate magnetic fields and when the focusing coil is exposed to the magnetic fields and also has an electric current passing therethrough a force is generated according to Fleming's Left-Hand Rule to drive the objective lens holder together with the objective lens along the axis of rotation (i.e., in the focusing direction). Furthermore, when the tracking coil is exposed to a magnetic field generated by the magnet and also has an electric current passing therethrough, a force is generated according to Fleming's Left-Hand Rule to drive the objective lens holder together with the objective lens in a direction of rotation around the axis of rotation (i.e., in the tracking direction).

If a pair of racking coils are asymmetric with respect to an axis of rotation then when the objective lens holder rotates, a magnetically asymmetric state can be provided. To address this, Japanese Patent Laying-Open No. 2002-50060 proposes to arrange the pair of tracking coils at a position in point symmetry with respect to the axis of rotation.

Conventionally when such a point symmetrical arrangement is adopted a pair of tracking coils is often arranged such that when the objective lens is not displaced in the tracking direction the pair of tracking coils is located on a centerline passing through a pair of magnets at their respective centers, since in such arrangement when the objective lens is not displaced in the tracking direction the tracking coils are situated on the magnets' centerline, at which a magnetic field is maximized in intensity, and the objective lens holder can be driven by a maximum force.

Figure 15:
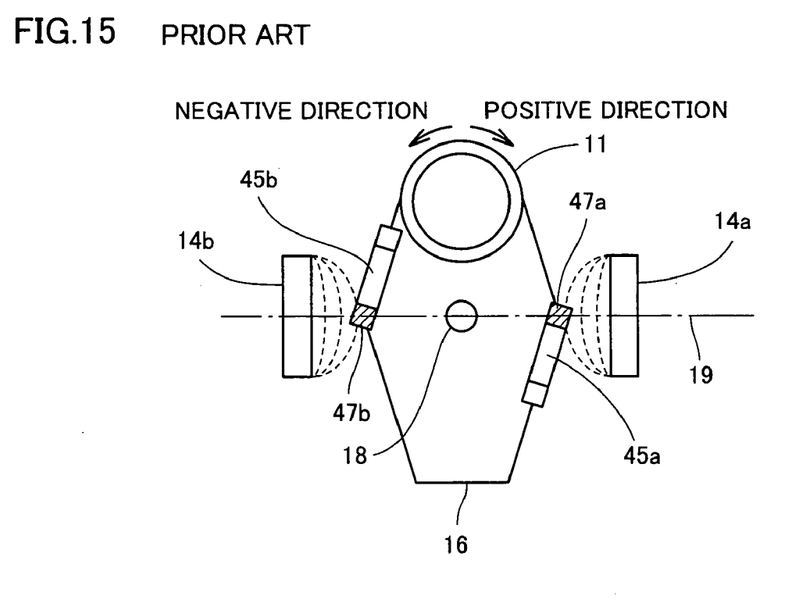
FIG. 15 is a cross section showing a conventional arrangement of a tracking coil.

FIG. 15 is a cross section showing a conventional arrangement of tracking coils. As shown in the figure, a centerline 19 passes through magnets 14a and 14b at their respective centers. Tracking coils 45a, 45b are air core coils rectangular in geometry. When the objective lens is not displaced in a tracking direction, i.e., when the objective lens holder does not rotate, tracking coil 45a has a vertical portion 47a on centerline 19 and tracking coil 45b has a vertical portion 47b on centerline 19.

Such arrangement as above, however, is disadvantageous as follows: when the objective lens is not displaced in the tracking direction, the objective lens holder is driven by a large force. When the objective lens is displaced in the tracking direction, however, the holder is driven by a reduced force.

Figure 16:
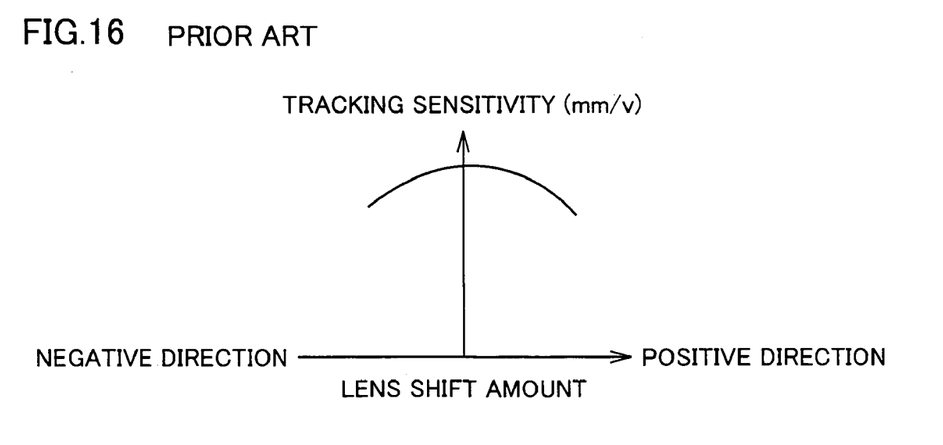
FIG. 16 illustrates a relationship between lens shift amount and tracking sensitivity as conventional.

FIG. 16 shows a relationship between lens shift amount and tracking sensitivity as conventional. A "lens shift amount" refers to an angle of rotation of an objective lens holder 16 around an axis of rotation 18. A lens shift amount of "0" indicates that objective lens 11 is not displaced in the tracking direction, i.e., that objective lens holder 16 is not rotating. "Tracking sensitivity" refers to a force that drives objective lens holder 16 in the tracking direction. As shown in the figure, when objective lens holder 16 rotates, the tracking sensitivity decreases. This is attributed to the following ground:

When objective lens holder 16 rotates in a positive direction or a negative direction, tracking coil 45a has vertical portion 47a moving away from centerline 19, which is exposed to an intense magnetic field, and thus experiencing a reduced force, and tracking coil 45b has vertical portion 47b moving away from centerline 19, which is exposed to an intense magnetic field, and thus experiencing a reduced force. Thus when objective lens holder 16 rotates in the positive or negative direction objective lens holder 16 is in its entirety driven by a reduced force.

Such a variation in the tracking sensitivity is not limited to the arrangement allowing a pair of tracking coils to be located on a centerline when objective lens 11 is not displaced in a tracking direction. Such variation generally occurs for arrangements having a pair of tracking coils arranged in point symmetry.

Such variation in the tracking sensitivity impairs the optical pickup device's tracking performance. In particular, if a seek operation is performed by tracking of an objective lens, the lens must significantly be displaced in the tracking direction. Increased displacements in the tracking direction, however, result in reduced driving forces, and the lens's position can not be matched to a targeted track's position.

SUMMARY OF THE INVENTION

The present invention therefore contemplates an optical pickup device that can prevent reduced driving force toward a tracking direction when an objective lens is displaced in the tracking direction.

The present invention in one aspect provides an optical pickup device having an objective lens holder with a pair of tracking coils and an objective lens fixed thereto, and a pair of magnets each generating a magnetic field, the tracking coil being exposed to the magnetic field while having an electric current passing therethrough to drive the objective lens in a tracking direction, wherein: the pair of tracking coils are rectangular or square in geometry; and the objective lens holder has the pair of tracking coils fixed thereto such that when the objective lens is not displaced in the tracking direction one of the tracking coils has a vertical portion closer to a centerline, passing through the pair of magnets at their respective centers, at a position distant from the centerline in a first direction of rotation by a prescribed angle and the other of the tracking coils has a vertical portion closer to the centerline at a position distant from the centerline in a direction of rotation opposite to the first direction of rotation by the prescribed angle.

The present invention in another aspect provides an optical pickup device having an objective lens holder with a pair of tracking coils and an objective lens fixed thereto, and a pair of magnets each generating a magnetic field, the tracking coil being exposed to the magnetic field while having an electric current passing therethrough to drive the objective lens in a tracking direction, wherein: the pair of tracking coils are trapezoidal in geometry; and the objective lens holder has the pair of tracking coils fixed thereto such that when the objective lens is not displaced in the tracking direction one of the tracking coils has a vertical portion closer to a centerline, passing through the pair of magnets at their respective centers, at a position distant from the centerline in a first direction of rotation by a prescribed angle and the other of the tracking coils has a vertical portion closer to the centerline at a position distant from the centerline in the first direction of rotation by the prescribed angle.

The present invention in still another aspect provides an optical pickup device having an objective lens holder with a pair of tracking coils and an objective lens fixed thereto, and a pair of magnets each generating a magnetic field, the tracking coil being exposed to the magnetic field while having an electric current passing therethrough to drive the objective lens in a tracking direction, wherein: the pair of tracking coils are triangular in geometry; and the objective lens holder has the pair of tracking coils fixed thereto such that when the objective lens is not displaced in the tracking direction one of the tracking coils has a vertical portion at a position distant from a centerline, passing through the pair of magnets at their respective centers, in a first direction of rotation by a prescribed angle and the other of the tracking coils has a vertical portion at a position distant from the centerline in the first direction of rotation by the prescribed angle.

The present invention in still another aspect provides an optical pickup device having an objective lens holder with a pair of tracking coils and an objective lens fixed thereto, and a pair of magnets each generating a magnetic field, the tracking coil being exposed to the magnetic field while having an electric current passing therethrough to drive the objective lens in a tracking direction, wherein: at least one of the tracking coils has at least one vertical portion and one of an arc and an oblique side; the objective lens holder has the pair of tracking coils fixed thereto such that when the objective lens is not displaced in the tracking direction one of the tracking coils has a vertical portion closer to a centerline, passing through the pair of magnets at their respective centers, at a position distant from the centerline in a first direction of rotation by a prescribed angle and the other of the tracking coils has a vertical portion closer to the centerline at a position distant from the centerline in the first direction of rotation by the prescribed angle; and the at least one tracking coil's arc or oblique side has passing therethrough an electric current having a vertical component opposite in direction to an electric current flowing through the vertical portion closer to the centerline.

The present optical pickup device can prevent reduced driving force toward a tracking direction if the objective lens is displaced in the tracking direction.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 8 specifically shows a geometry of a tracking coil 25a.

FIG. 11 specifically shows a geometry of a tracking coil 35a.

DESCRIPTION OF THE PREFERRED EMBODIMENTS

Hereinafter the present invention will be described in embodiments with reference to the drawings.

First Embodiment

The present embodiment relates to a suitable arrangement of a tracking coil.

Figure 1:
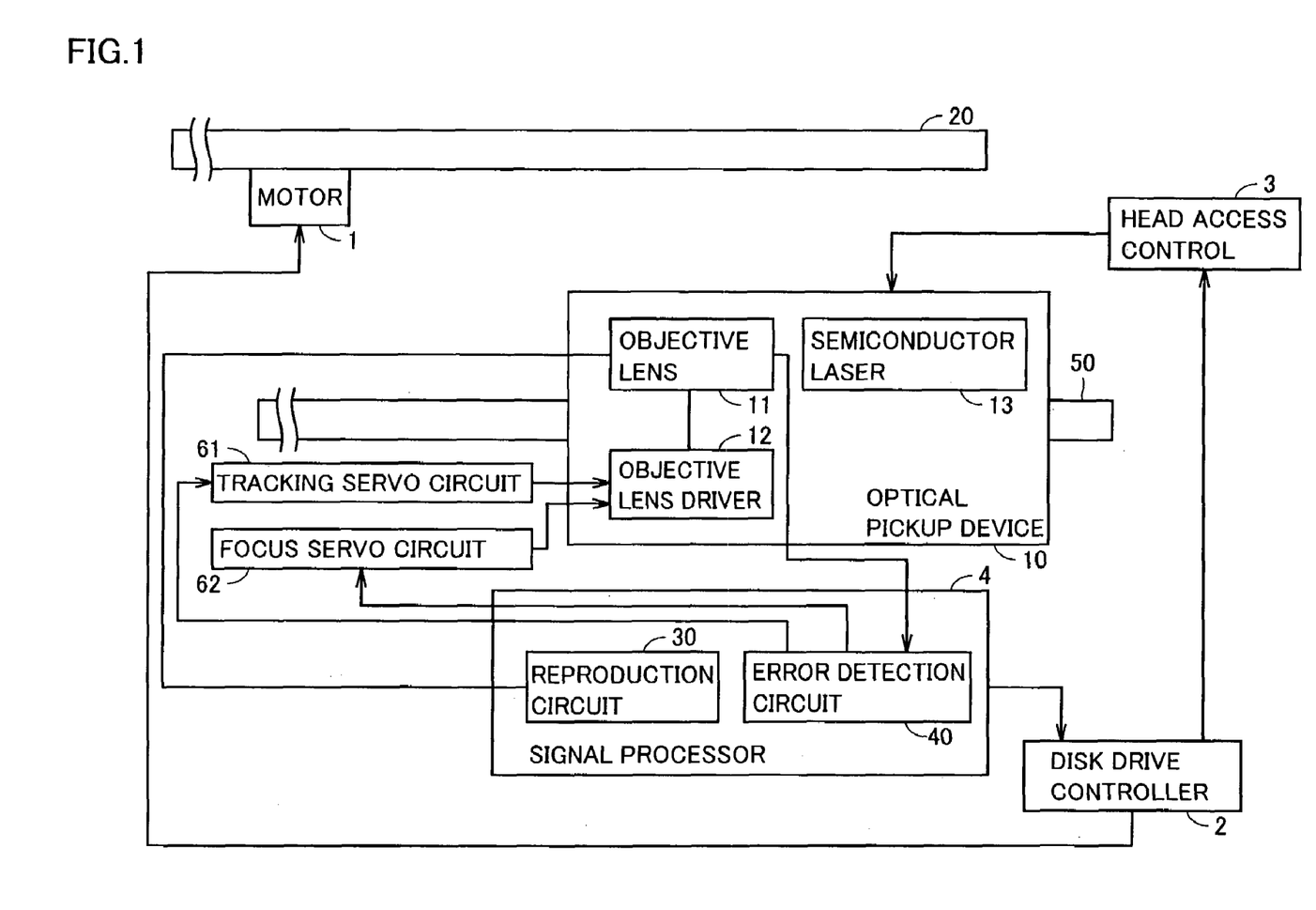
FIG. 1 shows a schematic configuration of an optical disk reproduction apparatus of the present invention in a first embodiment.

FIG. 1 schematically shows a configuration of an optical disk reproduction apparatus in accordance with the first embodiment. With reference to the figure, the optical disk reproduction apparatus includes a motor 1, a disk drive controller 2, a head access controller 3, a signal processor 4, an optical pickup device 10, a tracking servo circuit 61, a focus servo circuit 62, and a guide 50.

Motor 1 receives a control signal from disk drive controller 2 to rotate an optical disk 20 at a prescribed rate of rotation.

Optical pickup device 10 is driven by head access controller 3 along guide 50 in the optical disk 20a radial direction. Optical pickup device 10 includes a semiconductor laser 13 that serves as a source of light, an objective lens 11 that receives laser light output from semiconductor laser 13 and collects the light on optical disk 20 at a recording surface and also receives a reflection of light from the recording surface, and an objective lens driver 12 that drives objective lens 11.

Objective lens driver 12 includes a magnet, a focusing coil, and a tracking coil. Objective lens driver 12 is controlled by focus servo circuit 62 to apply an electric current to the focusing coil to drive objective lens 11 in a focusing direction. Objective lens driver 12 is also controlled by tracking servo circuit 61 to apply an electric current to the tracking coil to drive objective lens 11 in a tracking direction.

Signal processor 4 includes a reproduction circuit 30 and an error detection circuit 40.

Reproduction circuit 30 detects reflected light incident on objective lens 11 to generate a reproduction signal of data recorded on the recording surface.

Error detection circuit 40 detects from a reflection signal incident on the objective lens an offset of the objective lens in the tracking direction (i.e., that of the optical disk as seen radially) and an offset of the objective lens in the focusing direction (i.e., that of the optical axis of the laser beam) and from the detected offsets generates tracking and focusing error signals.

Tracking servo circuit 61 operates in response to the tracking error signal to control objective lens driver 12 to drive objective lens 11 to track properly.

Focus servo circuit 62 operates in response to the focusing error signal to control objective lens driver 12 to drive objective lens 11 to focus properly.

Figure 2:
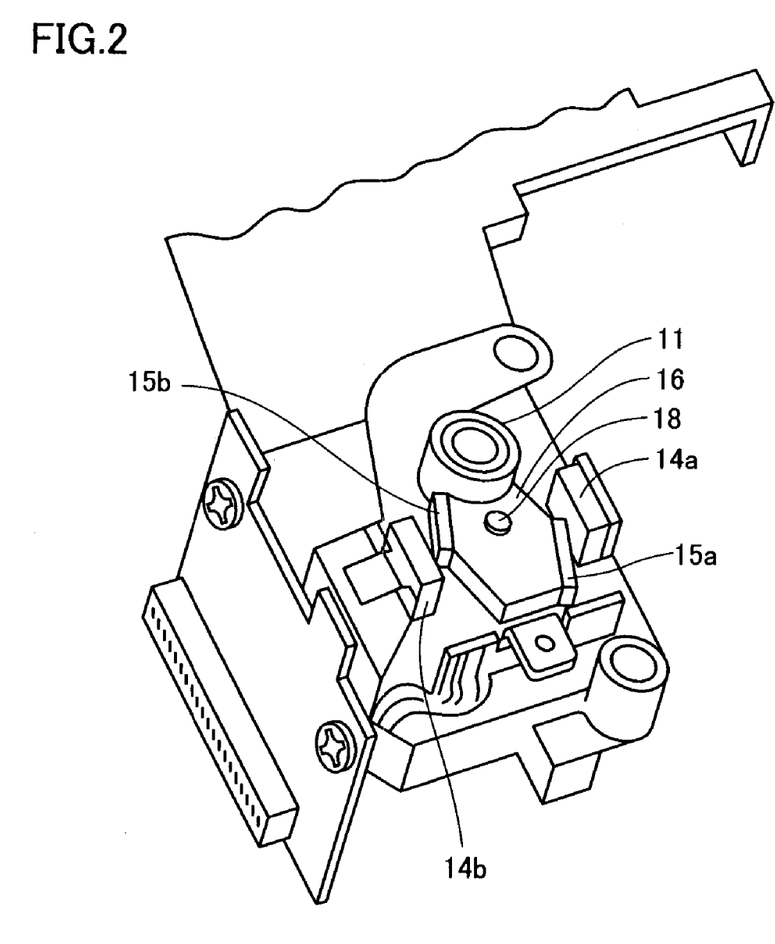
FIG. 2 schematically shows an optical pickup device 10.

FIG. 2 schematically shows optical pickup device 10. With reference to the figure, objective lens holder 16 has objective lens 11 and tracking coils 15a and 15b fixed thereto.

When tracking coil 15a exposed to a magnetic field generated by a magnet 14a has an electric current passing therethrough, tracking coil 15a receives a force in a direction of rotation around an axis of rotation 18 (i.e., in a tracking direction). Similarly, when tracking coil 15b exposed to a magnetic field generated by a magnet 14b has an electric current passing therethrough, tracking coil 15b receives a force in the direction of rotation around the axis of rotation 18 (i.e., the tracking direction).

Tracking coils 15a, 15b experiencing such forces allow objective lens holder 16, having tracking coils 15a, 15b fixed thereto, to rotate around the axis of rotation 18 to allow objective lens 11 to track.

Figure 3:
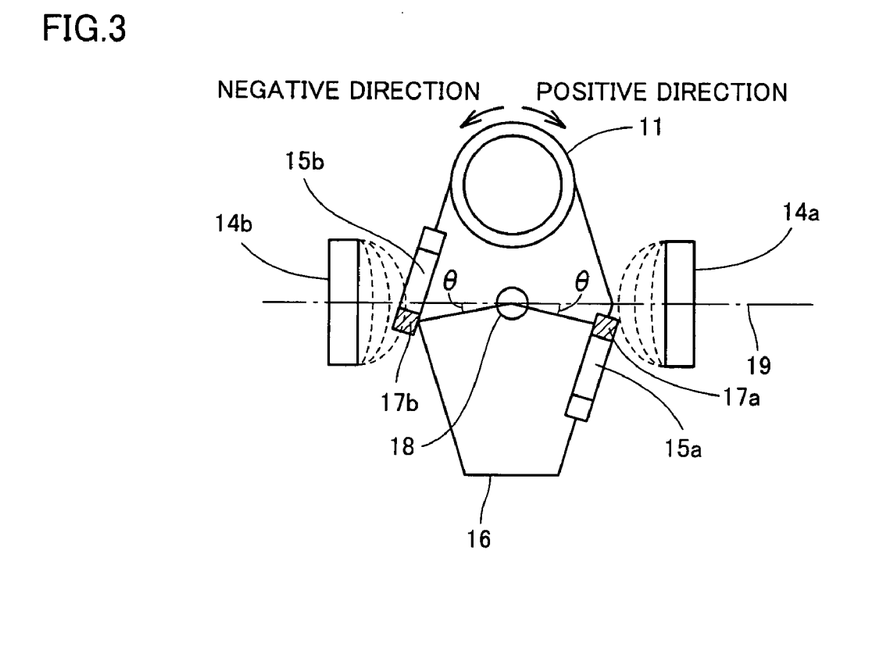
FIG. 3 is a cross section showing an arrangement of a tracking coil in the first embodiment.
Figure 4:
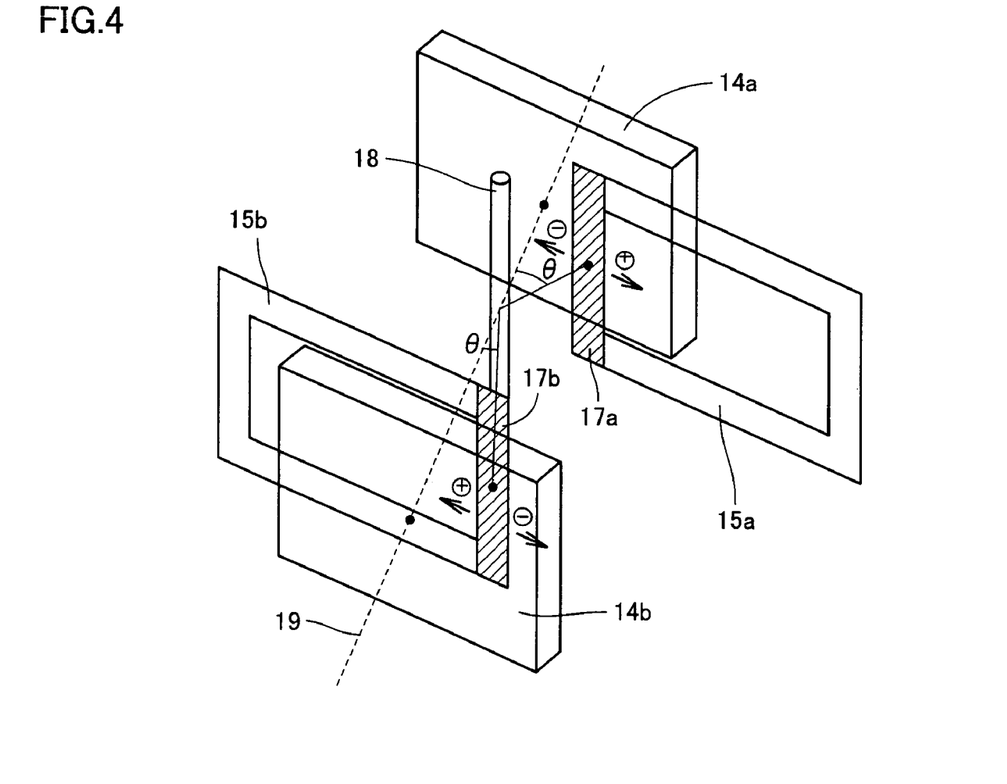
FIG. 4 is a perspective view showing an arrangement and geometry of the tracking coil in the first embodiment.

FIG. 3 is a cross section showing an arrangement of the tracking coils in the present embodiment and FIG. 4 is a perspective view showing an arrangement and geometry of the tracking coils in the present embodiment. In the figures, a centerline 19 passes through magnets 14a and 14b at their respective centers. Tracking coils 15a, 15b are air core coils rectangular in geometry. When objective lens 11 is not displaced in the tracking direction (i.e., when objective lens holder 16 is not rotating) tracking coil 15a has a vertical portion 17a at a position distant from centerline 19 in a positive direction by a prescribed angle θ and tracking coil 15b has a vertical portion 17b at a position distant from centerline 19 in a negative direction by the prescribed angle θ.

Figure 5:
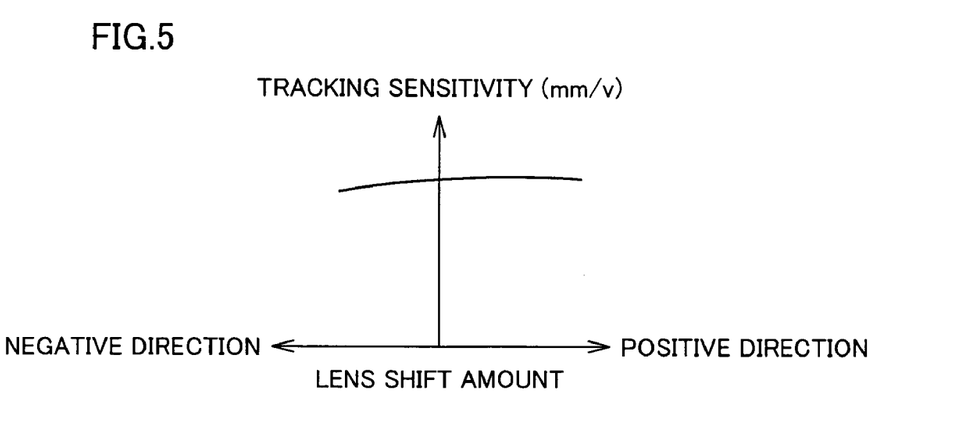
FIG. 5 illustrates a relationship between lens shift amount and tracking sensitivity in the first embodiment.

FIG. 5 represents a relationship between lens shift amount and tracking sensitivity in the present embodiment. A "lens shift amount" refers to an angle of rotation of objective lens holder 16 around the axis of rotation 18. A lens shift amount of "0" indicates that objective lens 11 is not displaced in the tracking direction, i.e., that objective lens holder 16 is not rotating. "Tracking sensitivity" refers to a force that drives objective lens holder 16 in the tracking direction.

As shown in FIG. 5, while objective lens holder 16 rotates, the tracking sensitivity does not vary, for the following ground:

When objective lens holder 16 rotates in the positive direction, tracking coil 15a has vertical portion 17a moving away from centerline 19 exposed to an intense magnetic field and vertical portion 17a thus experiences a reduced force, while tracking coil 15b has vertical portion 17b approaching centerline 19 exposed to an intense magnetic field and vertical portion 17b thus experiences an increased force. As such if objective lens holder 16 rotates in the positive direction objective lens holder 16 as seen in its entirety can be driven by a substantially constant force.

When objective lens holder 16 rotates in the negative direction, tracking coil 15a has vertical portion 17a approaching centerline 19 exposed to an intense magnetic field and vertical portion 17a thus experiences an increased force, while tracking coil 15b has vertical portion 17b moving away from centerline 19 exposed to an intense magnetic field and vertical portion 17b thus experiences a reduced force. As such if objective lens holder 16 rotates in the negative direction objective lens holder 16 as seen in its entirety can be driven by a substantially constant force.

Thus the present embodiment provides an optical pickup device having the pair of tracking coils 15a and 15b arranged so that when objective lens 11 is not displaced in the tracking direction, tracking coil 15a has vertical portion 17a at a position distant from centerline 19 in the positive direction by the prescribed angle θ and tracking coil 15b has vertical portion 17b at a position distant from centerline 19 in the negative direction by the prescribed angle θ to prevent reduced driving force toward the tracking direction when objective lens 11 is displaced in the tracking direction.

Second Embodiment

The present embodiment relates to a suitable geometry of the tracking coil.

Figure 6:
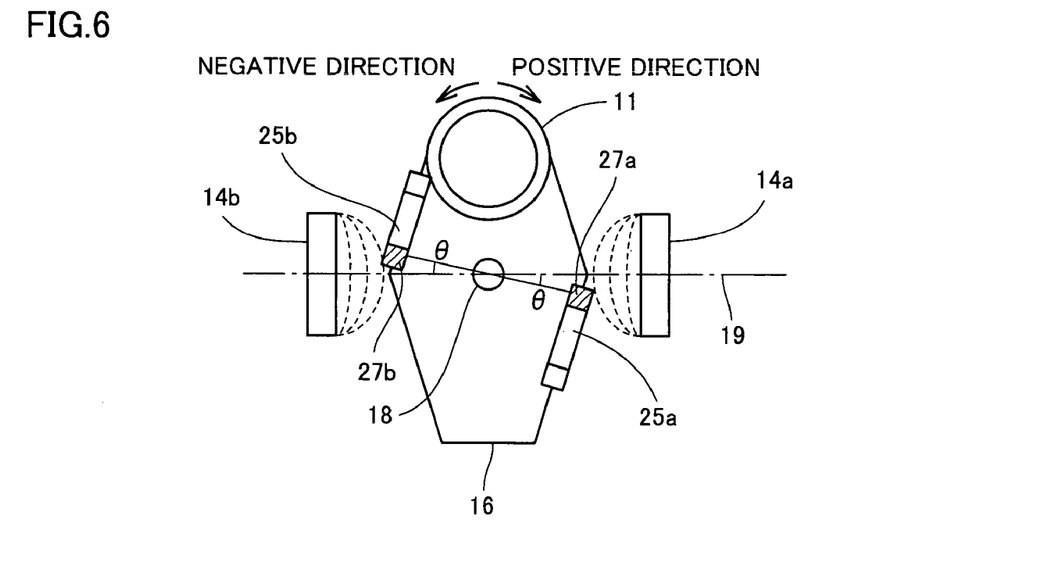
FIG. 6 is a cross section showing an arrangement of the tracking coil in a second embodiment.
Figure 7:
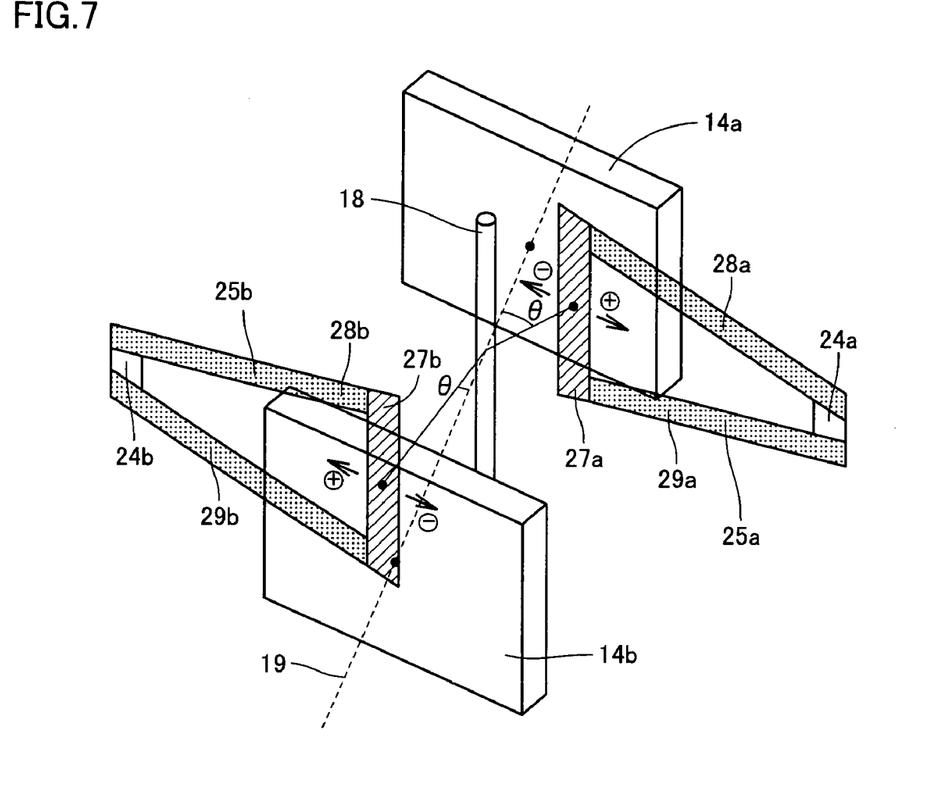
FIG. 7 is a perspective view showing an arrangement and geometry of the tracking coil in the second embodiment.

FIG. 6 is a cross section showing an arrangement of the tracking coils in the present embodiment and FIG. 7 is a perspective view showing an arrangement and geometry of the tracking coils in the present embodiment. In the figures, centerline 19 passes through magnets 14a and 14b at their respective centers. When objective lens 11 is not displaced in the tracking direction (i.e., when objective lens holder 16 is not rotating) a tracking coil 25a has a vertical portion 27a at a position distant from centerline 19 in a positive direction by a prescribed angle θ and a tracking coil 25b has a vertical portion 27b at a position distant from centerline 19 in a negative direction by the prescribed angle θ.

Figure 8:
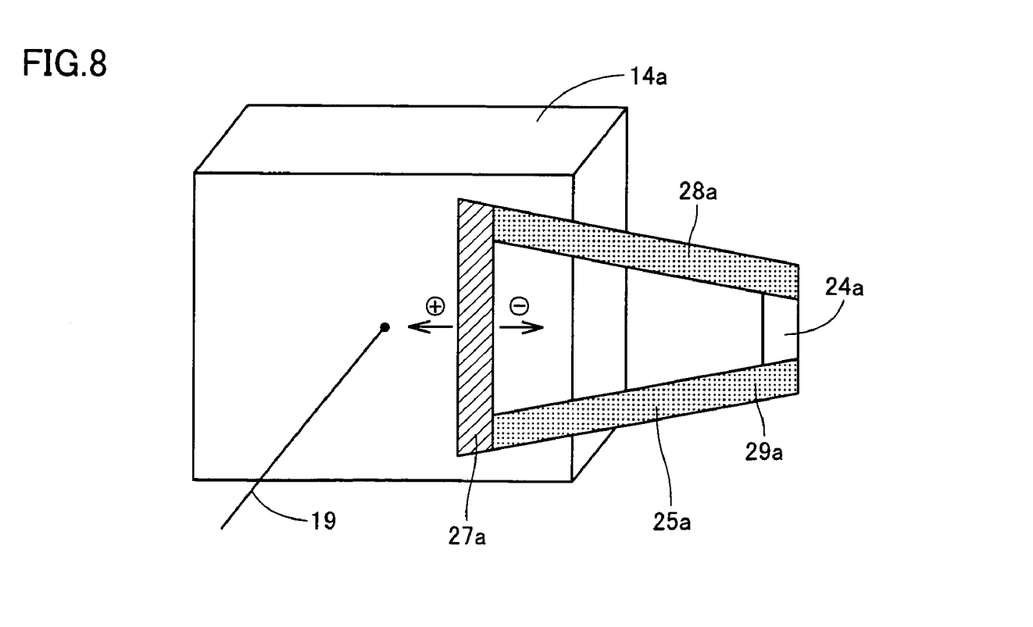

FIG. 8 specifically shows a geometry of tracking coil 25a. As shown in the figure, tracking coil 25a is an air core coil trapezoidal in geometry. More specifically, tracking coil 25a has vertical portions 27a and 24a, and oblique portions 28a and 29a having vertical and horizontal components.

The oblique portions 28a, 29a vertical components pass an electric current in a direction, and vertical portion 27a passes an electric current in an opposite direction. As such, according to Fleming's Left Hand Rule, when vertical portion 27a experiences a force in the positive direction oblique portions 28a, 29a experience a force in the negative direction. Furthermore, according to Fleming's Left Hand Rule, when vertical portion 27a experiences a force in the negative direction oblique portions 28a, 29a experience a force in the positive direction. Vertical portion 24a is distant from magnet 14a, and thus experiences a force that is neglectable, according to Fleming's Left Hand Rule.

Tracking coil 25b has a similarly trapezoidal geometry. As such, according to Fleming's Left Hand Rule, when vertical portion 27b experiences a force in the positive direction oblique portions 28b, 29b experience a force in the negative direction. Furthermore, according to Fleming's Left Hand Rule, when vertical portion 27b experiences a force in the negative direction oblique portions 28b, 29b experience a force in the positive direction. Vertical portion 24b is distant from magnet 14b, and thus experiences a force that is neglectable, according to Fleming's Left Hand Rule.

Figure 9:
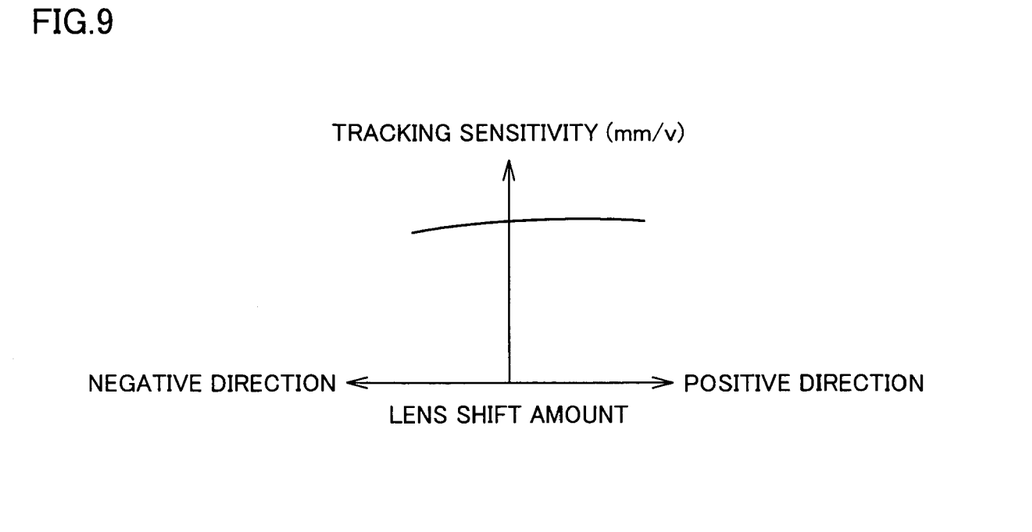
FIG. 9 shows a relationship between lens shift amount and tracking sensitivity in the second embodiment.

FIG. 9 illustrates a relationship between lens shift amount and tracking sensitivity in the present embodiment. As shown in the figure, the tracking sensitivity does not vary as objective lens holder 16 rotates. This is for the following ground:

When objective lens holder 16 rotates in the positive direction, the holder experiences a driving force, as described hereinafter:

Tracking coil 25a has vertical portion 27a moving away from centerline 19 exposed to an intense magnetic field. Vertical portion 27a thus experiences a reduced force in the positive (or negative) direction. However, tracking coil 25a also has oblique portions 28a, 29a moving away from centerline 19 exposed to intense magnetic field. Oblique portions 28a, 29a thus experience a reduced force in the negative (or positive) direction.

This similarly applies to tracking coil 25b. More specifically, tracking coil 25b has vertical portion 27b moving away from centerline 19 exposed to an intense magnetic field. Vertical portion 27b thus experiences a reduced force in the positive (or negative) direction. However, tracking coil 25b also has oblique portions 28b, 29b moving away from centerline 19 exposed to intense magnetic field. Oblique portions 28b, 29b thus experience a reduced force in the negative (or positive) direction.

Thus if objective lens 16 rotates in the positive direction objective lens holder 16 as seen in its entirety can be driven by a substantially constant force.

By contrast, when objective lens holder 16 rotates in the negative direction, objective lens holder 16 experiences a driving force, as described hereinafter:

Tracking coil 25a has vertical portion 27a approaching centerline 19 exposed to an intense magnetic field. Vertical portion 27a thus experiences an increased force in the negative (or positive) direction. However, tracking coil 25a also has oblique portions 28a, 29a approaching centerline 19 exposed to intense magnetic field. Oblique portions 28a, 29a thus experience an increased force in the positive (or negative) direction.

This similarly applies to tracking coil 25b. More specifically, tracking coil 25b has vertical portion 27b approaching centerline 19 exposed to an intense magnetic field. Vertical portion 27b thus experiences an increased force in the negative (or positive) direction. However, tracking coil 25b also has oblique portions 28b, 29b approaching centerline 19 exposed to intense magnetic field. Oblique portions 28b, 29b thus experience an increased force in the positive (or negative) direction.

As such, if objective lens holder 16 rotates in the negative direction, the holder as seen in its entirety can be driven by a substantially constant force.

Thus the present embodiment provides an optical pickup device including a pair of tracking coils 25a and 25b that is arranged so that when objective lens 11 is not displaced in the tracking direction tracking coil 25a has vertical portion 27a at a position distant from centerline 19 in the positive direction by the prescribed angle θ and tracking coil 25b has vertical portion 27b at a position distant from centerline 19 in the positive direction by the prescribed angle θ and that is trapezoidal in geometry to prevent reduced driving force toward the tracking direction when objective lens 11 is displaced in the tracking direction.

Third Embodiment

The present invention relates to a suitable geometry of the tracking coil.

In the second embodiment a vertical portion (in FIG. 8, vertical portion 24a, 24b) opposite a vertical portion (in FIG. 8, vertical portion 27a, 27b) is sufficiently distant from a magnet, and the force generated at the opposite vertical portions can be neglected. If such an opposite vertical portions is insufficiently distant from a magnet, however, the opposite vertical portion experiences an unexpected force, and the objective lens is driven in the tracking direction by a variable force and can thus not be controlled. The present invention relates to a geometry of the tracking coil to avoid such an unexpected force.

Figure 10:
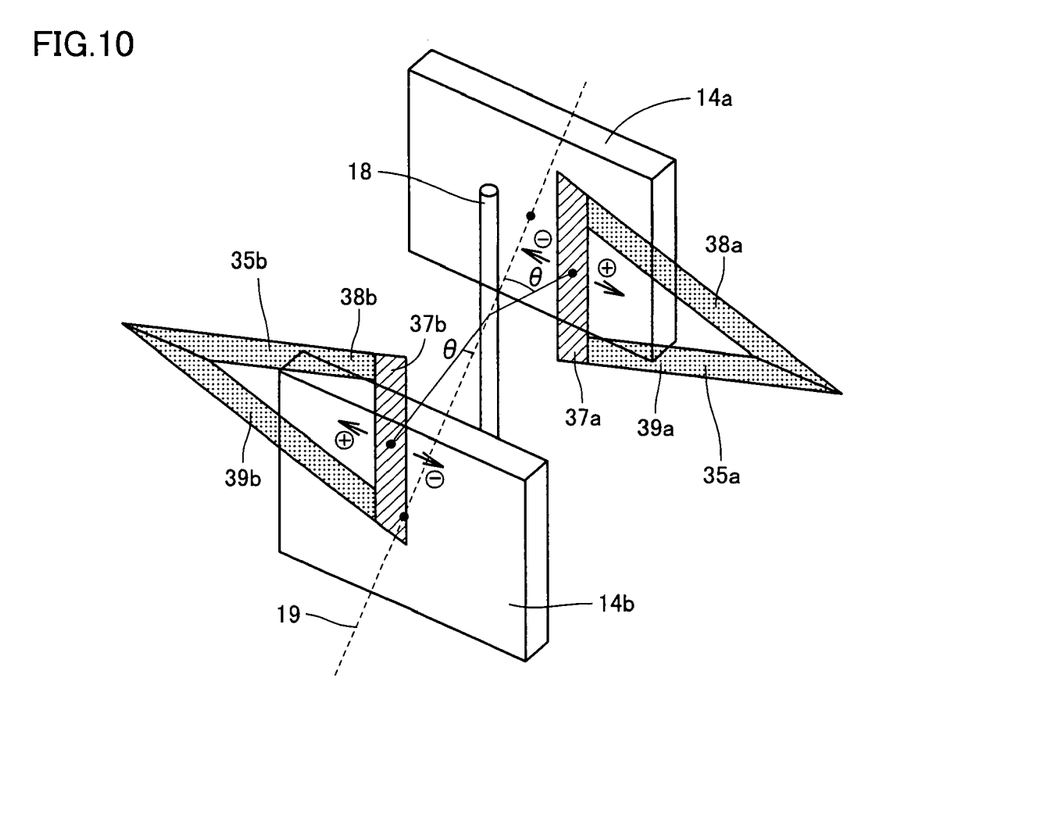
FIG. 10 is a perspective view showing an arrangement and geometry of the tracking coil in a third embodiment.

FIG. 10 is a perspective view showing an arrangement and geometry of tracking coils in the present embodiment. As shown in the figure, similarly as has been described in the second embodiment, when objective lens 11 is not displaced in the tracking direction a tracking coil 35a has a vertical portion 37a at a position distant from centerline 19 in a positive direction by a prescribed angle θ and a tracking coil 35b has a vertical portion 37b at a position distant from centerline 19 in the positive direction by the prescribed angle θ.

Figure 11:
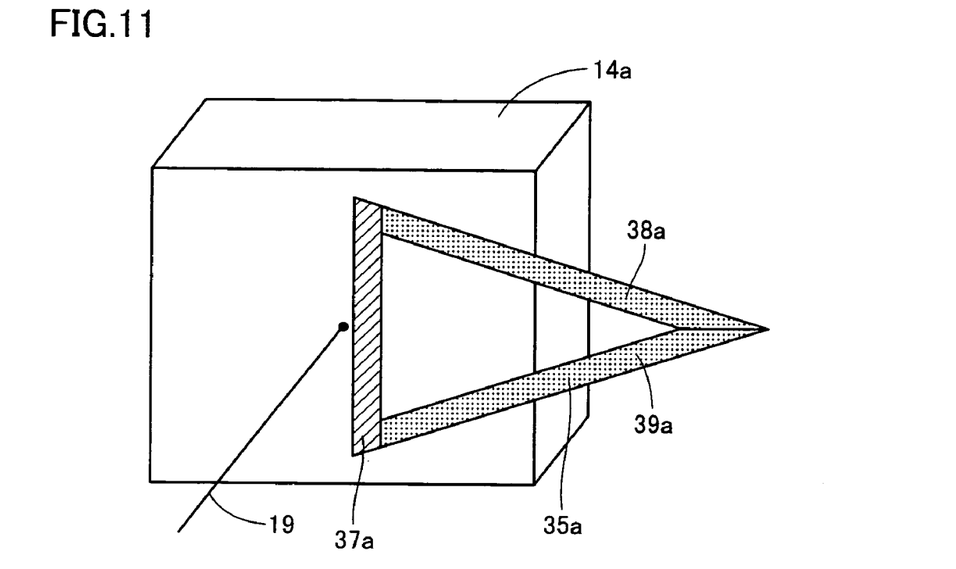

FIG. 11 specifically shows a geometry of tracking coil 35a. As shown in the figure, tracking coil 35a is an air core coil triangular in geometry. More specifically, tracking coil 35a has a vertical portion 37a and oblique portions 38a and 39a having vertical and horizontal components.

Similarly as has been described in the second embodiment, according to Fleming's Left Hand Rule, when vertical portion 37a experiences a force in the positive direction oblique portions 38a, 29a experience a force in the negative direction. Furthermore, according to Fleming's Left Hand Rule, when vertical portion 37a experiences a force in the negative direction oblique portions 38a, 39a experience a force in the positive direction. As tracking coil 35a is triangular in geometry, it does not have a vertical portion opposite vertical portion 37a. Tracking coil 35a can thus avoid an unexpected force that would otherwise act on the opposite vertical portion.

Tracking coil 35b has a similarly triangular geometry. As such, according to Fleming's Left Hand Rule, when vertical portion 37b experiences a force in the positive direction oblique portions 38b, 39b experience a force in the negative direction. Furthermore, according to Fleming's Left Hand Rule, when vertical portion 37b experiences a force in the negative direction oblique portions 38b, 39b experience a force in the positive direction. As tracking coil 35b is triangular in geometry, it does not have a vertical portion opposite vertical portion 37b. Tracking coil 35b can thus avoid an unexpected force that would otherwise act on the opposite vertical portion.

Figure 12:
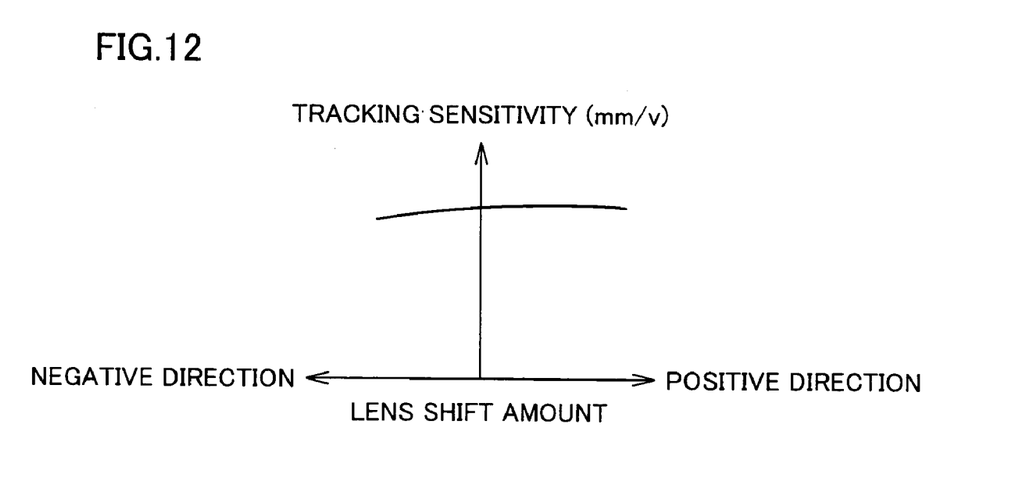
FIG. 12 illustrates a relationship between lens shift amount and tracking sensitivity in the third embodiment.

FIG. 12 illustrates a relationship between lens shift amount and tracking sensitivity in the present embodiment. As shown in the figure, the tracking sensitivity does not vary as objective lens holder 16 rotates. This is for the following ground:

When objective lens holder 16 rotates in the positive direction, the holder experiences a driving force, as described hereinafter:

Tracking coil 35a has vertical portion 37a moving away from centerline 19 exposed to an intense magnetic field. Vertical portion 37a thus experiences a reduced force in the positive (or negative) direction. However, tracking coil 35a also has oblique portions 38a, 39a moving away from centerline 19 exposed to intense magnetic field. Oblique portions 28a, 29a thus experience a reduced force in the negative (or positive) direction. Furthermore, tracking coil 35a does not have a vertical portion opposite vertical portion 37a and thus does not experience unexpected force opposite in direction to a force acting on vertical portion 37a.

This similarly applies to tracking coil 35b. More specifically, tracking coil 35b has vertical portion 37b moving away from centerline 19 exposed to an intense magnetic field. Vertical portion 37b thus experiences a reduced force in the positive (or negative) direction. However, tracking coil 35b also has oblique portions 38b, 39b moving away from centerline 19 exposed to intense magnetic field. Oblique portions 38b, 39b thus experience a reduced force in the negative (or positive) direction. Furthermore, tracking coil 35b does not have a vertical portion opposite vertical portion 37b and thus does not experience unexpected force opposite in direction to a force acting on vertical portion 37b.

Thus if objective lens 16 rotates in the positive direction objective lens holder 16 as seen in its entirety can be driven by a substantially constant force.

By contrast, when objective lens holder 16 rotates in the negative direction, objective lens holder 16 experiences a driving force, as described hereinafter:

Tracking coil 35a has vertical portion 37a approaching centerline 19 exposed to an intense magnetic field. Vertical portion 37a thus experiences an increased force in the negative (or positive) direction. However, tracking coil 35a also has oblique portions 38a, 39a approaching centerline 19 exposed to intense magnetic field. Oblique portions 38a, 39a thus experience an increased force in the positive (or negative) direction. Furthermore, tracking coil 35a does not have a vertical portion opposite vertical portion 37a and thus does not experience unexpected force opposite in direction to a force acting on vertical portion 37a.

This similarly applies to tracking coil 35b. More specifically, tracking coil 35b has vertical portion 37b approaching centerline 19 exposed to an intense magnetic field. Vertical portion 37b thus experiences an increased force in the negative (or positive) direction. However, tracking coil 35b also has oblique portions 38b, 39b approaching centerline 19 exposed to intense magnetic field. Oblique portions 38b, 39b thus experience an increased force in the positive (or negative) direction. Furthermore, tracking coil 35b does not have a vertical portion opposite vertical portion 37b and thus does not experience unexpected force opposite in direction to a force acting on vertical portion 37b.

As such, if objective lens holder 16 rotates in the negative direction, the holder as seen in its entirety can be driven by a substantially constant force.

Thus the present embodiment provides an optical pickup device including a pair of tracking coils 35a and 35b that is arranged so that when objective lens 11 is not displaced in the tracking direction tracking coil 35a has vertical portion 37a at a position distant from centerline 19 in the positive direction by a prescribed angle θ and tracking coil 35b has vertical portion 37b at a position distant from centerline 19 in the positive direction by the prescribed angle θ and that is triangular in geometry to prevent reduced driving force toward the tracking direction when objective lens 11 is displaced in the tracking direction.

The present invention is not limited to the above described embodiments and can for example include such an exemplary variation as follows:

(1) Geometry of Tracking Coil

While the first embodiment employs a pair of tracking coils rectangular in geometry, a pair of tracking coils square in geometry may be used.

While the second embodiment employs a pair of tracking coils trapezoidal in geometry. The present invention is, however, not limited thereto. One of the tracking coils may be trapezoidal as provided in the second embodiment and the other may be rectangular as provided in the first embodiment.

Figure 13:
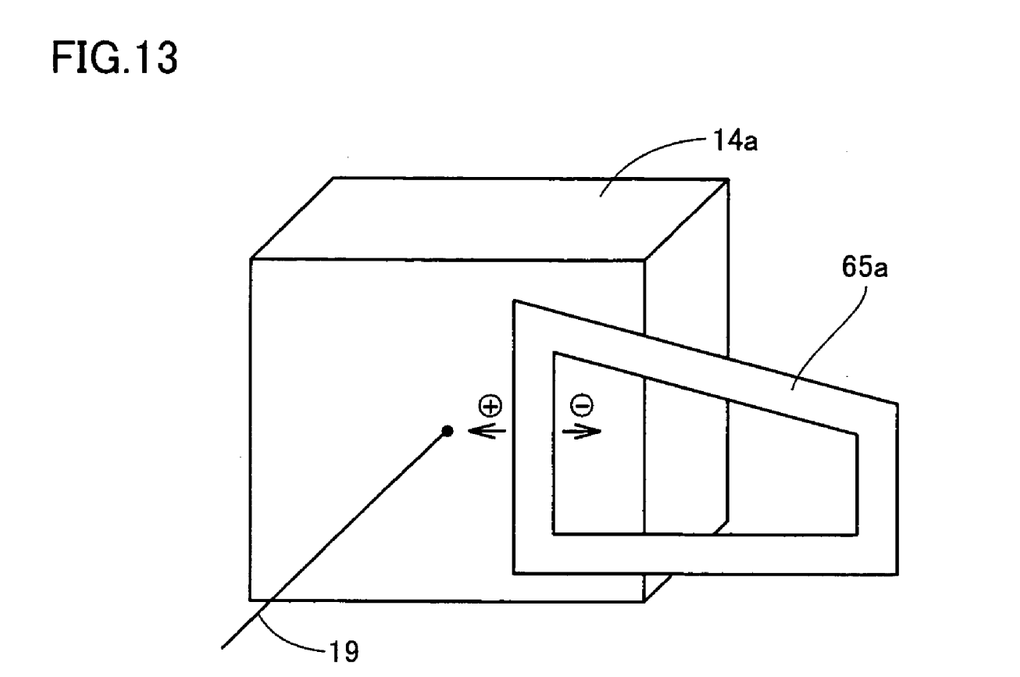
FIGS. 13 and 14 show exemplary variations of the tracking coil in geometry.
Figure 14:
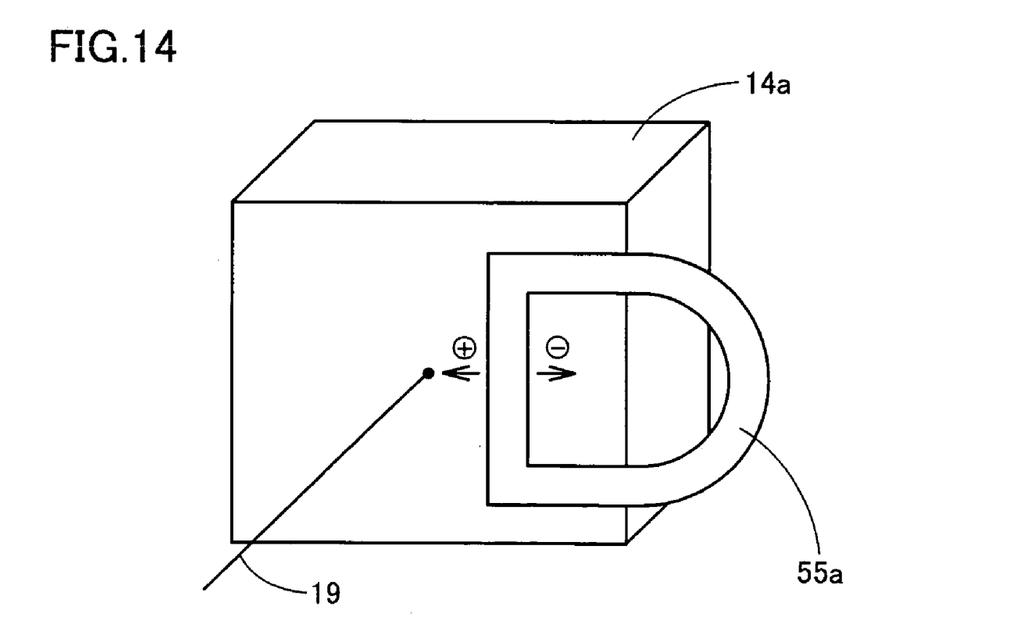

Furthermore, as shown in FIG. 13, the tracking coil may have only one side obliquely. Furthermore, as shown in FIG. 14, the tracking coil may have an arc in geometry. In the FIG. 14 example, as well as in the third embodiment, the tracking coil does not have a vertical portion opposite that closer to the centerline. Thus the coil can also avoid an unexpected force that would otherwise act on the opposite vertical portion.

Generally speaking, any pair of tracking coils, including those having the geometries as described above, that at least has one coil having at least one vertical portion, and one of an arc and an oblique side passing an electric current with a vertical component opposite in direction to an electric current flowing through a vertical portion closer to the centerline, can prevent tracking sensitivity from varying as objective lens holder 16 rotates.

(2) Arrangement of Tracking Coil

In the present embodiments, the prescribed angle θ corresponding to an offset of a vertical portion of a tracking coil from the centerline introduced when the objective lens is not displaced in the tracking direction, and an optimal value of a range within which the tracking coil rotates around the prescribed angle, depend on the tracking coil's size, the magnet's position and size, and other conditions, and may be set individually to accommodate different optical pickup devices.

Furthermore the second embodiment may have the condition imposed thereon that tracking coil 25a is rotated within a range such that vertical portion 27a is present within a range of angle of rotation from centerline 19 in the positive direction (i.e., in FIG. 6, tracking coil 25a is below centerline 19). This is done because if vertical portion 27a rotates away from centerline 19 in the negative direction, vertical portion 27a experiences a reduced force in the negative (or positive) direction, and despite that, oblique portions 28a, 29a experience an increased force in the positive (or negative) direction.

Similarly, the condition may be imposed that tracking coil 25b is rotated in a range such that vertical portion 27b is present within a range of angle of rotation from centerline 19 in the negative direction (i.e., in FIG. 6, tracking coil 25b is below centerline 19).

The third embodiment may similarly have imposed thereon such a condition of a range in which a tracking coil rotates.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An optical pickup device comprising:
an objective lens holder comprising:
a first tracking coil and a second tracking coil, each tracking coil comprising at least one vertical portion;
an axis of rotation about which said first and second tracking coils rotate; and
an objective lens; and
a first magnet and a second magnet generating a first magnetic field and a second magnetic field, respectively, and defining a centerline which passes through a center of each of the first magnet and the second magnet, through the axis of rotation, and through one of the first tracking coil and the second tracking coil;
wherein said first and second tracking coils are exposed to said first and second magnetic field, respectively, and an electric current passes through said first and second tracking coils to drive said objective lens in a tracking direction;

wherein said first and second tracking coils are one of rectangular and square in shape; and wherein when said objective lens is not displaced in said tracking direction, a vertical portion of said first tracking coil closest to the centerline is at a first distance from said centerline and in a first direction of rotation by a prescribed angles, and a vertical portion of the second tracking coil closest to said centerline is at a second distance from said centerline equal to the first distance and in a second direction of rotation opposite said first direction of rotation by said prescribed angle.

2. The optical pickup device of claim 1, wherein when said objective lens is not displaced in said tracking direction, the vertical portion of the first tracking coil closest to the centerline and the vertical portion of the second tracking coil closest to the centerline are both located on a same side of the centerline.

3. The optical pickup device of claim 1, wherein when said objective lens is not displaced in said tracking direction, a direction from the centerline to the objective lens is perpendicular to the centerline.

4. The optical pickup device of claim 1, wherein when said first tracking coil moves in a direction of increasing strength of the first magnetic field, the second tracking coil moves in a direction of decreasing strength of the second magnetic field.

5. The optical pickup device of claim 1, wherein when said objective lens rotates, said first tracking coil and said second tracking coil are driven by a substantially constant force.

6. An optical pickup device comprising:
an objective lens holder comprising:
a first tracking coil and a second tracking coil, each tracking coil comprising at least one vertical portion;
an axis of rotation about which said first and second tracking coils rotate; and
an objective lens, and
a first magnet and a second magnet generating a first magnetic field and a second magnetic field, respectively, and defining a centerline which passes through a center of each of the first magnet and the second magnet and through the axis of rotation;
wherein said first and second tracking coils are exposed to said first and second magnetic field, respectively, and an electric current passes through said first and second tracking coils to drive said objective lens in a tracking direction;
wherein said first and second tracking coils are trapezoidal in shape; and
wherein when said objective lens is not displaced in said tracking direction, a vertical portion of said first tracking coil closest to the centerline is at a first distance from said centerline and in a first direction of rotation by a prescribed angle, and a vertical portion of the second tracking coil closest to said centerline is at a second distance from said centerline equal to the first distance and in said first direction of rotation by said prescribed angle.

7. The optical pickup device of claim 6, wherein when said objective lens is not displaced in said tracking direction, the vertical portion of the first tracking coil closest to the centerline is located on a side of the centerline opposite the vertical portion of the second tracking coil closest to the centerline.

8. The optical pickup device of claim 6, wherein when said objective lens is not displaced in said tracking direction, a direction from the centerline to the objective lens is perpendicular to the centerline.

9. The optical pickup device of claim 6, wherein when said objective lens is not displaced in said tracking direction, the vertical portion of the first tracking coil and the vertical portion of the second tracking coil are not at positions of maximum magnetic field strength of the first magnetic field and the second magnetic field, respectively.

10. The optical pickup device of claim 6, wherein when said objective lens rotates, said first tracking coil and said second tracking coil are driven by a substantially constant force.

11. An optical pickup device comprising:
an objective lens holder comprising:
a first tracking coil and a second tracking coil, each tracking coil comprising a vertical portion;
an axis of rotation about which said first and second tracking coil rotate; and an objective lens, and
a first magnet and a second magnet generating a first magnetic field and a second magnetic field, respectively, and defining a centerline which passes through a center of each of the first magnet and the second magnet and through the axis of rotation;
wherein the first tracking coil and the second tracking coil are displaced at substantially opposite ends on the objective lens holder at a predetermined angle from the centerline;
wherein said first and second tracking coils are exposed to said first and second magnetic field, respectively, and an electric current passes through said first and second tracking coils to drive said objective lens in a tracking direction;
wherein said first and second tracking coils are triangular in shape; and
wherein when said objective lens is not displaced in said tracking direction, the vertical portion of said first tracking coil is at a first position from the centerline and in a first direction of rotation by a prescribed angles, and the vertical portion of the second tracking coil is at a second distance from said centerline equal to the first distance and in said first direction of rotation by said prescribed angle.

12. The optical pickup device of claim 11, wherein when said objective lens is not displaced in said tracking direction, the vertical portion of the first tracking coil is located on a side of the centerline opposite the vertical portion of the second tracking coil.

13. The optical pickup device of claim 11, wherein when said objective lens is not displaced in said tracking direction, a direction from the centerline to the objective lens is perpendicular to the centerline.

14. The optical pickup device of claim 11, wherein when said objective lens is not displaced in said tracking direction, the vertical portion of the first tracking coil and the vertical portion of the second tracking coil are not at positions of maximum magnetic field strength of the first magnetic field and the second magnetic field, respectively.

15. The optical pickup device of claim 11, wherein when said objective lens rotates, said first tracking coil and said second tracking coil are driven by a substantially constant force.

16. An optical pickup device comprising:
an objective lens holder comprising:
a first tracking coil and a second tracking coil, each tracking coil comprising at least one vertical portion;

an axis of rotation about which said first and second tracking coil rotate; and an objective lens, and a first magnet and a second magnet generating a first magnetic field and a second magnetic field, respectively, and defining a centerline which passes through a center of each of the first magnet and the second magnet and through the axis of rotation;

wherein the first tracking coil and the second tracking coil are displaced at substantially opposite ends on the objective lens holder at a predetermined angle from the centerline;

wherein said first and second tracking coils are exposed to said first and second magnetic field, respectively, and an electric current passes through said first and second tracking coils to drive said objective lens in a tracking direction;

wherein at least one of said first and second tracking coils has at least one vertical portion and an arc;

wherein when said objective lens is not displaced in said tracking direction, a vertical portion of said first tracking coil closest to the centerline is at a first distance from said centerline and in a first direction of rotation by a prescribed angles, and a vertical portion of the second tracking coil closest to said centerline is at a second distance from said centerline equal to the first distance and in said first direction of rotation by said prescribed angle; and wherein said arc has passing therethrough an electric current having a vertical component opposite in direction to an electric current flowing through said vertical portion, which is closer to said centerline than the arc.

17. The optical pickup device of claim 16, wherein when said objective lens is not displaced in said tracking direction, the vertical portion of the first tracking coil closest to the centerline is located on a side of the centerline opposite the vertical portion of the second tracking coil closest to the centerline.

18. The optical pickup device of claim 16, wherein when said objective lens is not displaced in said tracking direction, a direction from the centerline to the objective lens is perpendicular to the centerline.

19. The optical pickup device of claim 16, wherein when said objective lens is not displaced in said tracking direction, the vertical portion of the first tracking coil and the vertical portion of the second tracking coil are not at positions of maximum magnetic field strength of the first magnetic field and the second magnetic field, respectively.

20. The optical pickup device of claim 16, wherein when said objective lens rotates, said first tracking coil and said second tracking coil are driven by a substantially constant force.

* * * * *

UNITED STATES PATENT AND TRADEMARK OFFICE
CERTIFICATE OF CORRECTION

| | | |
|---|---|---|
| PATENT NO. | : 7,251,819 B2 | Page 1 of 1 |
| APPLICATION NO. | : 10/911053 | |
| DATED | : July 31, 2007 | |
| INVENTOR(S) | : Chiaki Hashimoto | |

It is certified that error appears in the above-identified patent and that said Letters Patent is hereby corrected as shown below:

In the Claims:

In Claim 1, column 11, line 10, the word "angles" should be --angle--.

In Claim 11, column 12, line 40, the word "angles" should be --angle--.

In Claim 16, column 13, line 24, the word "angles" should be --angle--.

Signed and Sealed this

Eighth Day of April, 2008

JON W. DUDAS
*Director of the United States Patent and Trademark Office*